United States Patent
Finlow-Bates et al.

(10) Patent No.: US 10,601,598 B2
(45) Date of Patent: Mar. 24, 2020

(54) SYSTEM AND METHOD FOR STORING THE LOCATION ON A BLOCKCHAIN OF A HASH OF A DIGITAL ITEM WITHIN SAID DIGITAL ITEM

(71) Applicants: Keir Finlow-Bates, Kangasala (FI); Jonathan Sean Callan, Cambridge (GB)

(72) Inventors: Keir Finlow-Bates, Kangasala (FI); Jonathan Sean Callan, Cambridge (GB)

(*) Notice: Subject to any disclaimer, the term of this patent is extended or adjusted under 35 U.S.C. 154(b) by 385 days.

(21) Appl. No.: 15/801,441

(22) Filed: Nov. 2, 2017

(65) Prior Publication Data
US 2019/0132138 A1    May 2, 2019

(51) Int. Cl.
| | | |
|---|---|---|
| *H04L 9/30* | (2006.01) | |
| *H04L 9/32* | (2006.01) | |
| *H04L 9/34* | (2006.01) | |
| *H04L 29/08* | (2006.01) | |
| *H04L 9/36* | (2006.01) | |
| *H04L 29/06* | (2006.01) | |

(52) U.S. Cl.
CPC ............... *H04L 9/34* (2013.01); *H04L 9/30* (2013.01); *H04L 9/3236* (2013.01); *H04L 9/3247* (2013.01); *H04L 9/3297* (2013.01); *H04L 9/36* (2013.01); *H04L 63/12* (2013.01); *H04L 67/1097* (2013.01); *H04L 2209/38* (2013.01)

(58) Field of Classification Search
CPC ..... H04L 9/34; H04L 9/30; H04L 9/36; H04L 63/12
USPC .......................................................... 726/5
See application file for complete search history.

(56) References Cited

U.S. PATENT DOCUMENTS

| | | | | |
|---|---|---|---|---|
| 10,097,356 | B2 | 10/2018 | Zinder | |
| 10,505,741 | B1* | 12/2019 | Conley | H04L 63/0428 |
| 2007/0088957 | A1* | 4/2007 | Carson | G06F 21/64 |
| | | | | 713/176 |
| 2016/0283920 | A1* | 9/2016 | Fisher | G06Q 20/02 |
| 2018/0191502 | A1* | 7/2018 | Karame | G06Q 20/065 |
| 2018/0234234 | A1 | 8/2018 | Hurley et al. | |
| 2019/0079998 | A1* | 3/2019 | Rush | G06F 16/335 |
| 2019/0087892 | A1* | 3/2019 | Pinski | G06Q 40/02 |
| 2019/0108519 | A1* | 4/2019 | Asif | H04L 9/3236 |
| 2019/0123889 | A1* | 4/2019 | Schmidt-Karaca | H04L 9/3236 |
| 2019/0272392 | A1* | 9/2019 | Falah | G06F 21/645 |

\* cited by examiner

*Primary Examiner* — Shin-Hon (Eric) Chen
*Assistant Examiner* — Dereena T Cattungal

(57) ABSTRACT

A system and method is presented for storing a location on a blockchain of a hash, such as a cryptographic hash, digital fingerprint, or digest, of a digital item, such as a document, file, sound clip, or computer code, within the digital item itself. The blockchain may be used for providing a provenance of the digital item by generating the hash of the digital item and submitting it within a transaction to the blockchain. The system and method presented allow the location of the hash within the blockchain to be embedded within the digital item before said hash is generated and submitted, providing a clear link between a record of the hash and the digital item in question, and reducing the computational and network resources required to verify the provenance of the digital item.

24 Claims, 9 Drawing Sheets

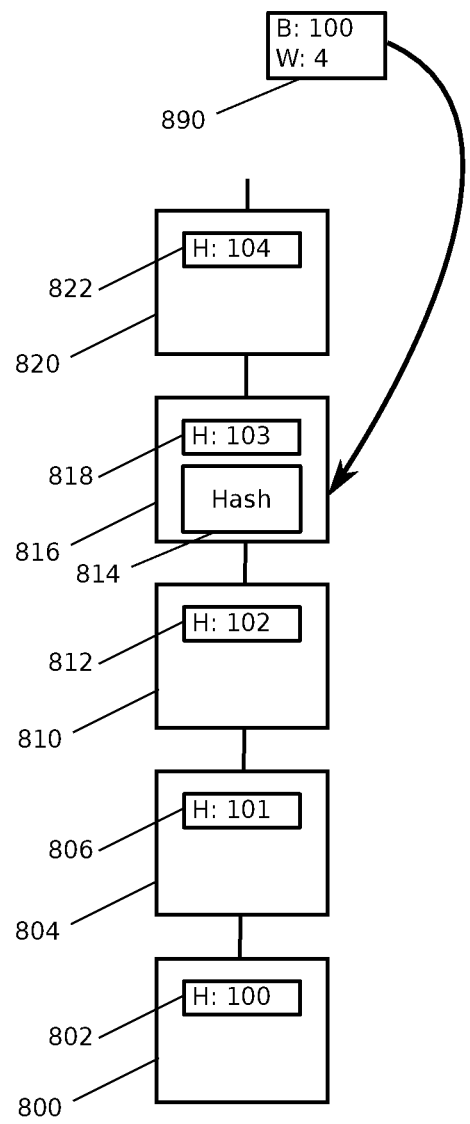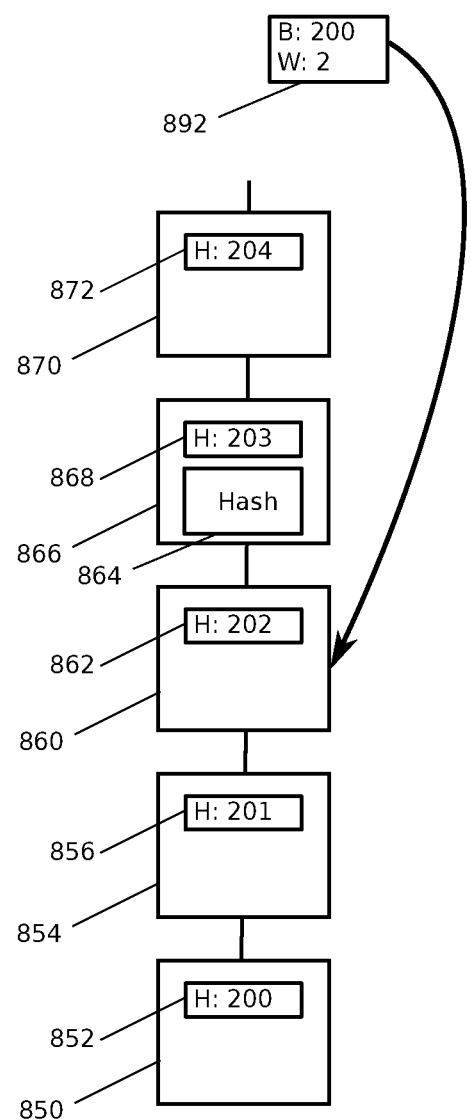
FIG. 8A  FIG. 8B

SYSTEM AND METHOD FOR STORING THE LOCATION ON A BLOCKCHAIN OF A HASH OF A DIGITAL ITEM WITHIN SAID DIGITAL ITEM

TECHNICAL FIELD

This disclosure relates to computer systems and methods concerned with a generation and a storage of hashes of digital items such as but not limited to: documents, files, sound clips, video clips, software programs, computer games, and other computer data, on a distributed ledger or blockchain, henceforth referred to as the blockchain, and more specifically to an integrity and a provenance of the digital items and a discovery of said hashes.

BACKGROUND

In the current state of the art, a hash, a digest, a cryptographic hash, or a digital fingerprint, of a digital item, may be stored on the blockchain in order to provide a provenance of a digital item. For example, the hash of a digital copy of a legal contract may be submitted to a Bitcoin blockchain or an Ethereum blockchain, in order to prove that said legal contract existed at a given time.

Similarly, a veracity of a computer program may be determined through a means of a program vendor providing the computer program for download, and at a different location a hash of a binary data comprising the computer program. A customer may then download the computer program, independently calculate the hash of the computer program from the binary data comprising the computer program, and verify that the hash calculated matches the hash of the binary data as provided by the program vendor.

In order to provide increased confidence in the computer program as downloaded, the program vendor may choose to provide the hash of the binary data on the blockchain, for example a public blockchain such as the Bitcoin blockchain or the Ethereum blockchain.

There are problems associated with a current provision of the digital item and its corresponding hash. A first problem is that the hash may need to be provided out of band—that is to say—the hash may need to be provided at a different location to the digital item. As a result, the customer may need to determine the different location independently, for example by searching for it.

A second problem is that by including a location of the hash in the digital item, the hash calculated from the digital item is changed. This may result in a never-ending loop of hash calculation, whereby the program vendor calculates the hash, includes the location on the blockchain of the hash in the digital item, re-calculates the hash for the digital item and determines that it has now changed, and may therefore be required to re-calculate the hash anew.

A third problem is that calculating the hash of the digital item and searching through the blockchain for the presence of said hash, using a network connected device with one or more of limited computational power, limited memory, and limited network bandwidth, such as an Internet-Of-Things device, may be infeasible.

It is therefore the intention of the present disclosure to address a problem of ensuring that the provision of the hash of the digital item and the digital item itself are linked in a fashion, by ensuring that the digital item contains an indicator or pointer to the location of the hash, in order to provide an improved provenance for the digital item, and to reduce computational power, memory, and network bandwidth required to discover the hash and verify said improved provenance.

SUMMARY

In accordance with the present disclosure, a solution is provided for a generation of a hash of a digital item, for storage on the blockchain or a resource location, such that the digital item comprises the indicator to the location of the hash on the blockchain or in a resource indicated by the resource location.

Blockchains provided in, for example, a peer-to-peer network, such as a distributed ledger used in a Bitcoin cryptocurrency blockchain or an Ethereum distributed application blockchain, allow for a storage of a data on the blockchain as, for example, a data string, a block of binary data, a meta-data, or as a transaction submitted to the peer-to-peer network comprising the data.

The data may comprise the hash of the digital item, such as but not limited to: a cryptographic hash, a digest, a digital fingerprint.

Blockchain data validators, comprising, in a preferred embodiment of the present disclosure, a plurality of network connected devices participating in maintaining and extending the blockchain, may receive data and messages over the peer-to-peer network, which they may package into data blocks for potential inclusion in the blockchain. Such data may comprise the hash.

In an embodiment, the plurality of network connected devices, each comprising a one or more processors, and storage media comprising computer instructions, said plurality of network connected devices being connectible via a peer-to peer network to each other, are arranged such that when computer instructions are executed on the one or more processors of a one or more of the plurality of network connected devices, operations are caused on a first of the plurality of network connected device for generating the indicator to the location on the blockchain where the hash may be found.

In an embodiment, operations may commence by the first of the plurality of network connected devices determining a current location on the blockchain, which may comprise one or more of a height of a current block of the blockchain, a size of the blockchain, or a current timestamp stored within the blockchain.

Subsequently, the first of the plurality of network connected devices may estimate a likely future location on the blockchain. As the blockchain may grow over time, a likely future location may comprise one or more of a height of a future block, a future size of the blockchain, or a future timestamp that the first of the plurality of network connected devices may estimate as a possible or a probable location at a future time.

In this embodiment, the first of the plurality of network connected devices may then generate an indicator for the likely location of the hash of the digital item, comprising an estimate of the likely future location.

In an embodiment, the indicator may also comprise a resource identifier, such as but not limited to: a universal resource locator, a universal resource identifier, a location of a server on a network or a database identifier.

In an embodiment, the indicator may also comprise a hash algorithm used in calculating the hash. Said hash algorithm may comprise a one, or more, or a serial combination of: SHA, RIPEMD, Whirlpool, Scrypt, HAS-160, BLAKE, or other cryptographic hash function.

In another embodiment, the indicator may also or alternately comprise a blockchain identifier, such as but not limited to: an identity of a blockchain, for example the Bitcoin cryptocurrency blockchain, the Ethereum blockchain, or some other identifiable blockchain.

In another embodiment, the indicator may also or alternately comprise a blockchain authorization, such as but not limited to a blockchain account username, a blockchain account password, a blockchain address.

In an embodiment, the indicator may also or alternately comprise a digital signature produced by the first of the plurality of network connected devices using a private key associated with a public key. The indicator may further comprise the public key.

In a further embodiment, the likely future location may also comprise a location window of uncertainty, which may comprise one or more of, but not be limited to: a predetermined number of blocks, a predetermined data size, a predetermined period of time. The location window of uncertainty may then allow for a less accurate specification of the location of the hash of the digital item by providing an area or a neighborhood upon the blockchain in which to search for the hash, as opposed to providing an exact location of the hash.

The first of the plurality of network connected devices may then edit a first digital item, said first digital item comprising for example but not limited to: a document, a file, a sound clip, a video clip, a software program, a computer game, or an other computer data; and may generate a new digital item comprising the first digital item and the indicator.

The first of the plurality of network connected devices may then compute or calculate a hash of the new digital item.

The first of the plurality of network connected devices may then transmit a transaction or a message that comprises the hash of the new digital item to a remainder of the plurality of network connected devices, for inclusion on the blockchain. In one embodiment the first of the plurality of network connected devices may delay a sending of the transaction until the first of the plurality of network connected devices estimates that the transaction is likely to be included on the blockchain at a location close to the likely future location. In another embodiment the first of the plurality of network connected devices may repeatedly transmit the transaction until the first of the plurality of network connected devices determines that the transaction has been included at a location sufficiently close to the likely future location. In both embodiments, "close to the likely future location" may be defined to be within the location window of uncertainty surrounding the likely future location.

In a further embodiment of the disclosure, the first of the plurality of network connected devices may repeat a process of estimating the likely future location, generating the indicator, including the indicator in the digital item, calculating the hash of the digital item, and submitting the hash in the transaction or the message for inclusion on the blockchain, until the first of the plurality of network connected devices determines that the transaction comprising the hash has been included on the blockchain at an acceptable position or location on the blockchain, as determined by the likely future location estimated and the location window of uncertainty.

We move now to a brief examination of a second complementary part of the disclosure, concerning a retrieval of the hash of the digital item from the blockchain for comparison with a computed hash of the digital item.

In an embodiment, a network connected device may extract the indicator from the digital item, and using information contained within the indicator, such as, but not limited to, the blockchain location, the likely future location on the blockchain and the location window of uncertainty, may generate a determined location for the hash of the digital item.

The network connected device may then search and retrieve from the blockchain, at the determined location, the hash of the digital item.

The network connected device may, either then or prior to extracting the indicator, produce a computed hash of the digital item. In one embodiment the indicator may comprise a hash algorithm used in generating the hash of the digital item, and the network connected device may extract this information from the indicator and use said hash algorithm in producing the computed hash. The hash algorithm may be a one, or more, or a serial combination of: SHA, RIPEMD, Whirlpool, Scrypt, HAS-160, BLAKE, or other cryptographic hash function.

Finally, the network connected device may then compare the computed hash with the hash retrieved from the blockchain. If both are identical, the network connected device may then return a successful result. If the computed hash and the hash retrieved from the blockchain do not match, then the network connected device may return an unsuccessful result.

Those skilled in the art will further appreciate the advantages and superior features found in this disclosure together with other important aspects thereof on reading the detailed description that follows in conjunction with the drawings.

BRIEF DESCRIPTION OF THE DRAWINGS

The components in the figures are not necessarily to scale, emphasis instead being placed upon illustrating the principles of the present disclosure. In the figures, like reference numerals designate corresponding parts throughout the different views.

FIG. 8A is a diagram illustrating a successful inclusion of the indicator within a window of uncertainty on a blockchain.

FIG. 8B is a diagram illustrating an unsuccessful inclusion of the indicator lying outside the window of uncertainty on the blockchain.

DETAILED DESCRIPTION

Figure 1:
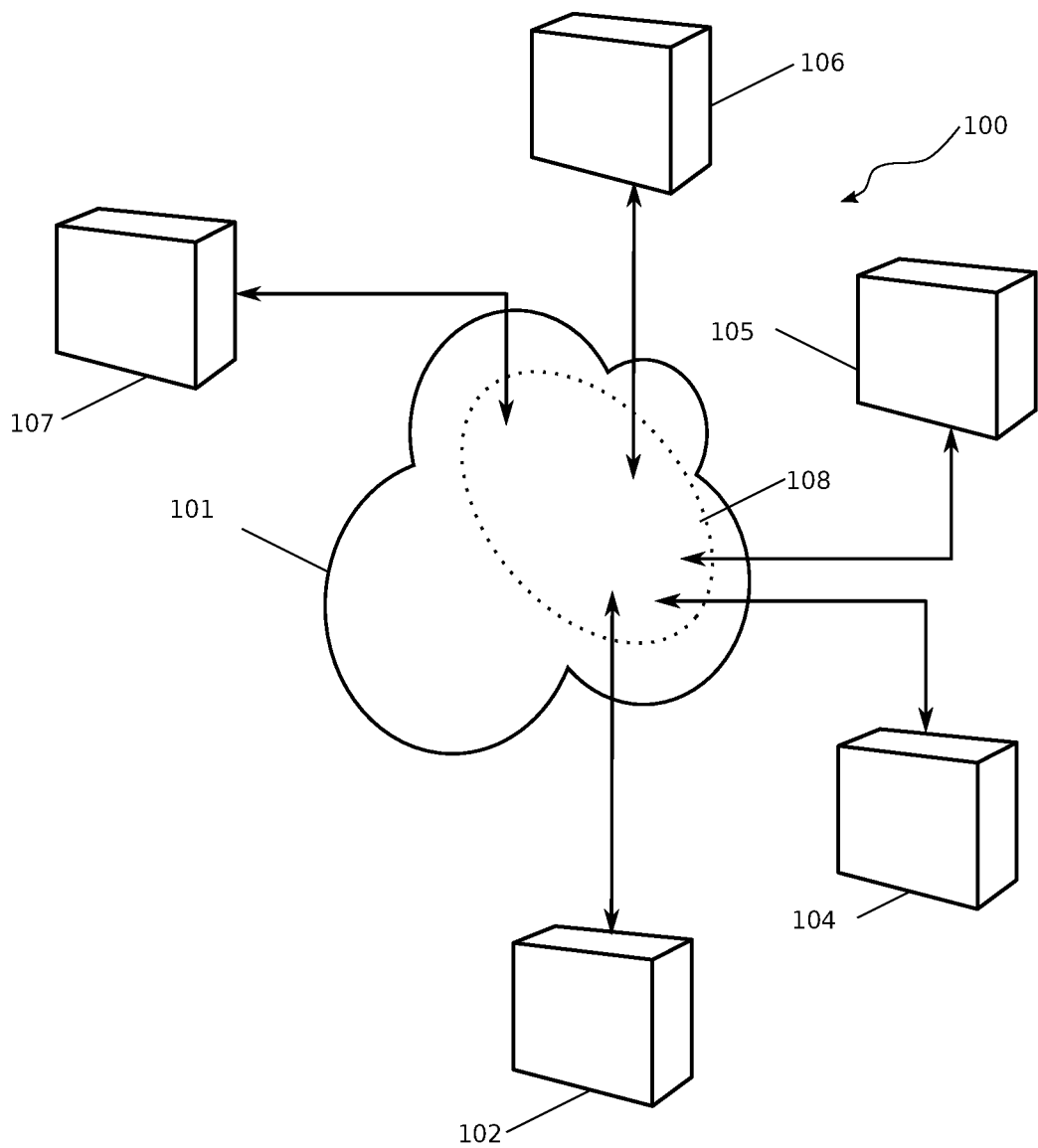
FIG. 1 illustrates a peer-to-peer network with a plurality of network connected devices connected to the peer-to-peer network, through which a blockchain may be instantiated, maintained, and extended, in accordance with an embodiment of the present disclosure.

Aspects of this disclosure will be described in the context of an exemplary system of a plurality network connected devices communicating through the medium of a network system 100, thereby implementing a blockchain, as shown schematically in FIG. 1.

As depicted, a peer-to-peer network 108 is embodied within a packet switched network 101, through the interconnection of the plurality of network connected devices on the peer-to-peer network 108.

A network connected device 102 may connect to the peer-to-peer network through a direct connection to the packet switched network with a wired connection, or through a wireless connection by association with a wireless access point, a cellular base station, a Bluetooth connection, or other means of connection.

Other devices connected to the peer-to-peer network may include network connected devices acting as blockchain nodes, for example network connected device 104, whose role may be to maintain a list of other devices connected through the peer-to-peer network, and to forward on received network messages to those devices on the list, possibly independently, or possibly as a response to a request from another network connected device. As one skilled in the art will be aware, no individual communication node is required to have a complete list of all devices, as the process of peer-to-peer networking only requires that a union of a set of all communication nodes contains a complete list of all devices on the peer-to-peer network, and that for every pair of network connected devices there is a network route from one device to the other, possibly via a set of one or more nodes. Therefore, the only requirement to be a participant on the peer-to-peer network is to establish a connection to one or more of the communication nodes on said network.

Further devices connected via the peer-to-peer network may include one or more network connected devices 105, 106, 107, each acting as a blockchain node or a validator node, whose role may be to act as a communication node, and who may also be able to receive a hash publication message and other transaction or data messages from the peer-to-peer network, process them according to the methods and processes to be described further below, and transmitting the results of said processing back to the peer-to-peer network for potential inclusion in the blockchain.

The devices described above may be implemented through a system comprising a one or a plurality of: a general purpose microprocessor, a digital signal processor (DSP), an application specific instruction set processor (ASIP), a field programmable gate array (FPGA), a dedicated application specific integrated circuit (ASIC), or other equivalent integrated or discrete logic circuitry and peripheral circuitry, connected to a tangible storage medium containing instructions which when executed effect methods and techniques described below. The techniques additionally, or alternatively, may be realized at least in part by a computer-readable communication medium or record carrier, that carries or communicates code in the form of instructions or data structures and that may be accessed, read, and/or executed by a computer.

Figure 2:
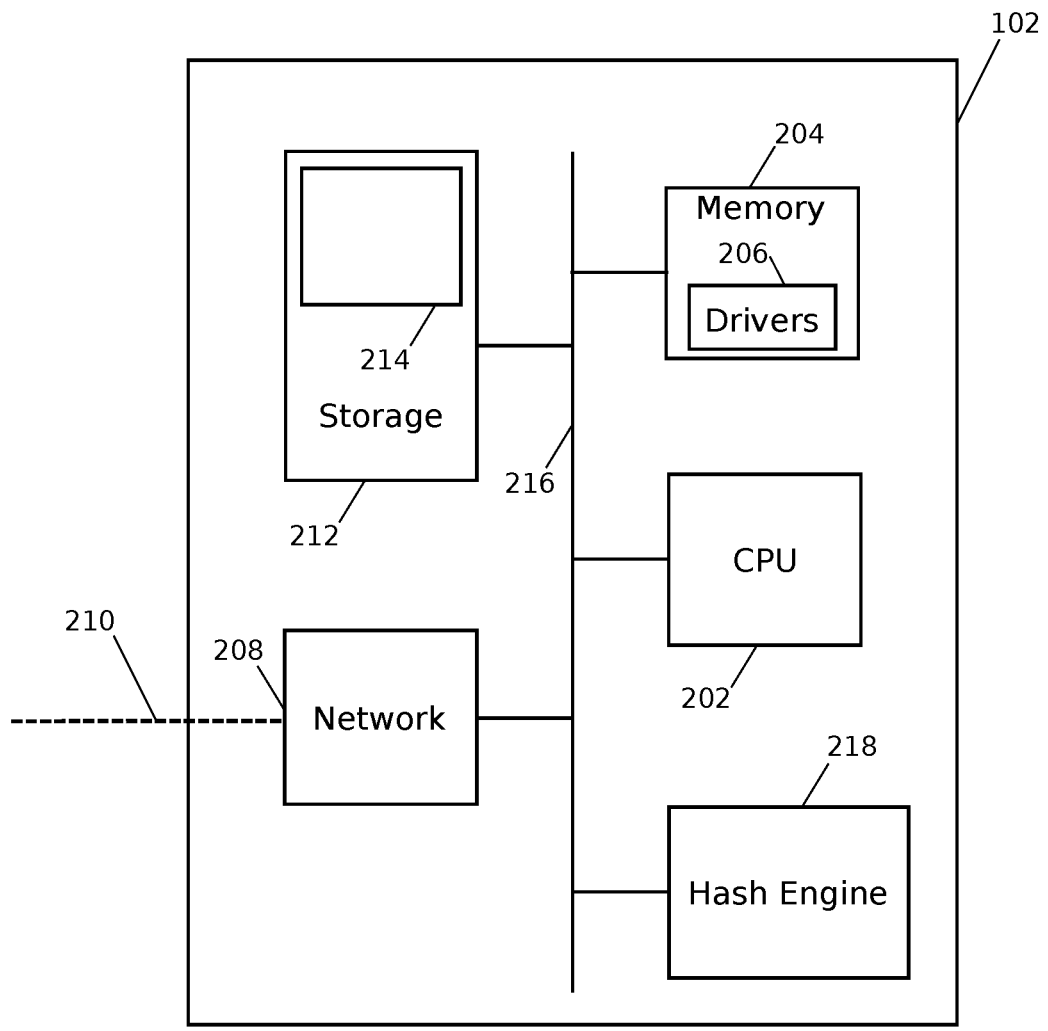
FIG. 2 illustrates a network connected device that may be utilized in a generation of a digital item comprising an indicator to a location on a blockchain of a hash of the digital item, said network connected device also submitting a transaction to the blockchain for including the hash of the digital item on the blockchain, in accordance with an embodiment of the present disclosure.

An embodiment of the network connected device 102 is presented in FIG. 2, and is now discussed in further detail. The network connected device 102 may include a one or more central processing units (CPU) 202 capable of executing instructions stored in a memory 204, and controlling other peripheral components through drivers 206 stored within the memory 204.

Further storage 212 may be present, which may contain a digital item 214, providing a digital representation of, for example, a document, a file, a sound clip, a video clip, a software program, a computer game, an other computer data.

The network connected device 102 may connect to the packet switched network through a network module 208, which may consist of a direct wired connection to the packet switched network through a cable 210. In a different embodiment, the network module 208 may contain wireless components comprising one or more wireless modules implemented in firmware or hardware, including a wireless local area network (WLAN) unit such as a Wi-Fi adapter utilizing an 802.11 protocol, a wireless wide area network (WWAN) unit such as Global System for Mobile communications (GSM), Long Term Evolution (LTE), or other cellular wireless data communication system, or a Bluetooth unit. The wireless components may provide network connectivity to a packet switched network and hence to the peer-to-peer network for the network connected device.

Components comprising the network connected device 102 may communicate through a bus 216, which may be implemented as a peripheral component interconnect express (PCIe) bus, a universal serial bus (USB), a universal asynchronous receiver/transmitter (UART) serial bus, a suitable advanced micro-controller bus architecture (AMBA) interface, a serial digital input output (SDIO) bus, or other equivalent interface.

The network connected device 102 may, in some embodiments, include a hash engine 218, comprising dedicated hardware, or software, or both, for an enhanced calculation of a hash of the digital item using a hash algorithm hard-coded or embedded within the hash engine.

Figure 3:
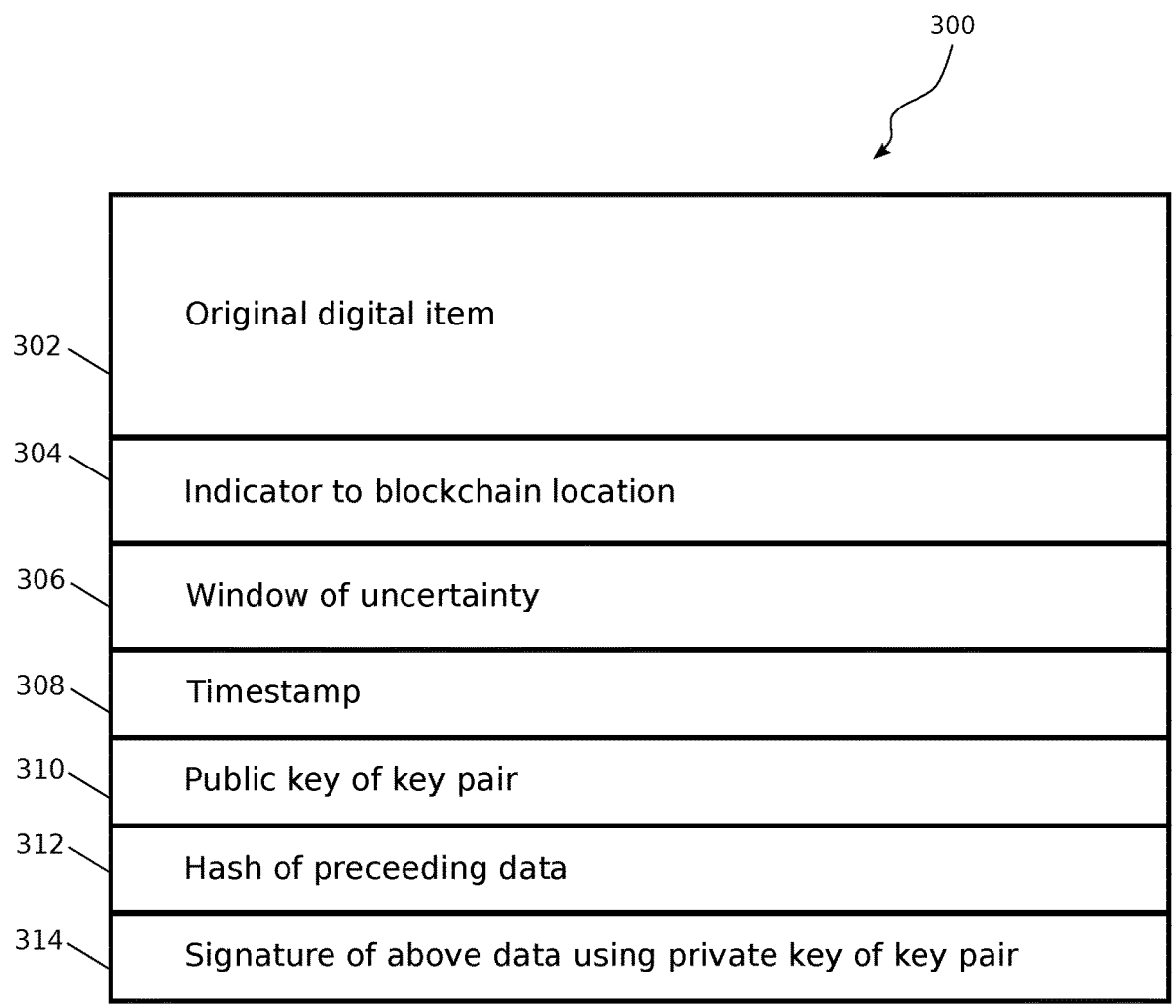
FIG. 3 is a block diagram illustrating a structure of a possible embodiment of the digital item comprising the indicator, in accordance with an embodiment of the present disclosure.

In an embodiment, the network connected device 102 may edit an original digital item 302 to comprise other elements, resulting in a new digital item 300, a possible structure of which is described in FIG. 3.

The new digital item 300 may comprise the original digital item 302. Note that although in FIG. 3 the original digital item 302 is shown at the head of the new digital item, in other embodiments of the new digital item the components comprising it may be in a different order. The original digital item 302 may be further edited to comprise a header indicating a file type of the original digital item, and other header information such as a length of the original digital item and a version number or other identification of the original digital item.

The new digital item 300 may comprise an indicator to a blockchain location 304, which may describe a location on the blockchain where the hash of the new digital item or a hash of a part of the new digital item may be found. The indicator may be included in binary format, in JavaScript Object Notation (JSON), in text (TXT), in Extensible Markup Language (XML), or in an other data format recognizable by a computing device as encoding a description of the location as applicable to the blockchain. In some embodiments the location may comprise: a future block height, a future blockchain size, a subsequent block with a subsequently determined identifier, or a future timestamp.

The location may be estimated by the network connected device based on a prediction by the network connected device as to when the hash of the new digital item may be included on the blockchain. For example, the location may be a future block height that is three blocks higher than a current block height of the blockchain, and the network connected device may submit a transaction containing the indicator comprising the location at a point in time when it predicts that the current block height has increased to match the future block height.

The new digital item 300 may include a window of uncertainty 306, by which in one embodiment a new digital item may provide further information on where on the blockchain to search for the hash of the new digital item, and in which range or neighborhood surrounding the location indicated by the indicator to the location on the blockchain the hash may be found. In further embodiments, if the hash is found outside of the window of uncertainty 306 it may be considered as invalid by other network connected devices determining the validity of the new digital item.

In various embodiments the window of uncertainty 306 may comprise one or more of: a predetermined number of blocks, a predetermined data size, a predetermined period of time. In some of these various embodiments the window of uncertainty 306 may be centered on the location indicated by the indicator, whereas in others the window of uncertainty 306 may specify a distance either side of the location indicated by the indicator, within which the hash may be found and determined as potentially valid.

The new digital item 300 may comprise a timestamp 308, which in one embodiment may be used to indicate from what point in time onward in the blockchain the hash of the new digital item should be searched for. In another embodiment the timestamp may be used to indicate when the new digital item was generated.

The new digital item 300 may include a public key 310 of a public/private key pair generated by the network connected device 102 submitting the hash of the new digital item to the blockchain. The public key infrastructure or algorithm may be one of ECDSA, digital signature algorithm (DSA), Rivest, Shamir, & Adleman (RSA), ElGamal, or some other secure asymmetric cryptographic key system.

The new digital item 300 may also include a hash 312 of a data contained in a preceding message content. The data to be hashed may comprise one or more of the public key of the public/private key pair 310, the timestamp 308, the window of uncertainty 306, the indicator to the location on the blockchain 304, and the original digital item 302. The hash may be one of a secure hash algorithm (SHA), RACE integrity primitives evaluation message digest (RIPEMD), Whirlpool, Scrypt, HAS-160, BLAKE, or other cryptographic hash function applied to the preceding content of the message.

The new digital item 300 may also include a digital signature 314, generated using a private key of the public/private key pair associated with the public key 310 and the hash 312 of the data contained in the preceding message content, in order to provide for a veracity or an authentication of an integrity or a provenance of a part or of a whole of the new digital item 300. The digital signature algorithm used may be one of ECDSA, DSA, RSA, ElGamal, or some other secure asymmetric key digital signing algorithm.

In an embodiment, an authorization, for example a second digital signature, may be appended to or inserted into a transaction or message for transmittal to the blockchain, comprising the hash 312 of the new digital item, and may include a hash of some or all of the transaction, and the digital signature 314, generated using a second private key of a second public/private key pair, for example a public key of an agency or a device providing permission to insert the hash of the digital item into the blockchain. In this embodiment, the authorization may be added at a later stage by one other of the plurality of network connected devices.

Figure 4:
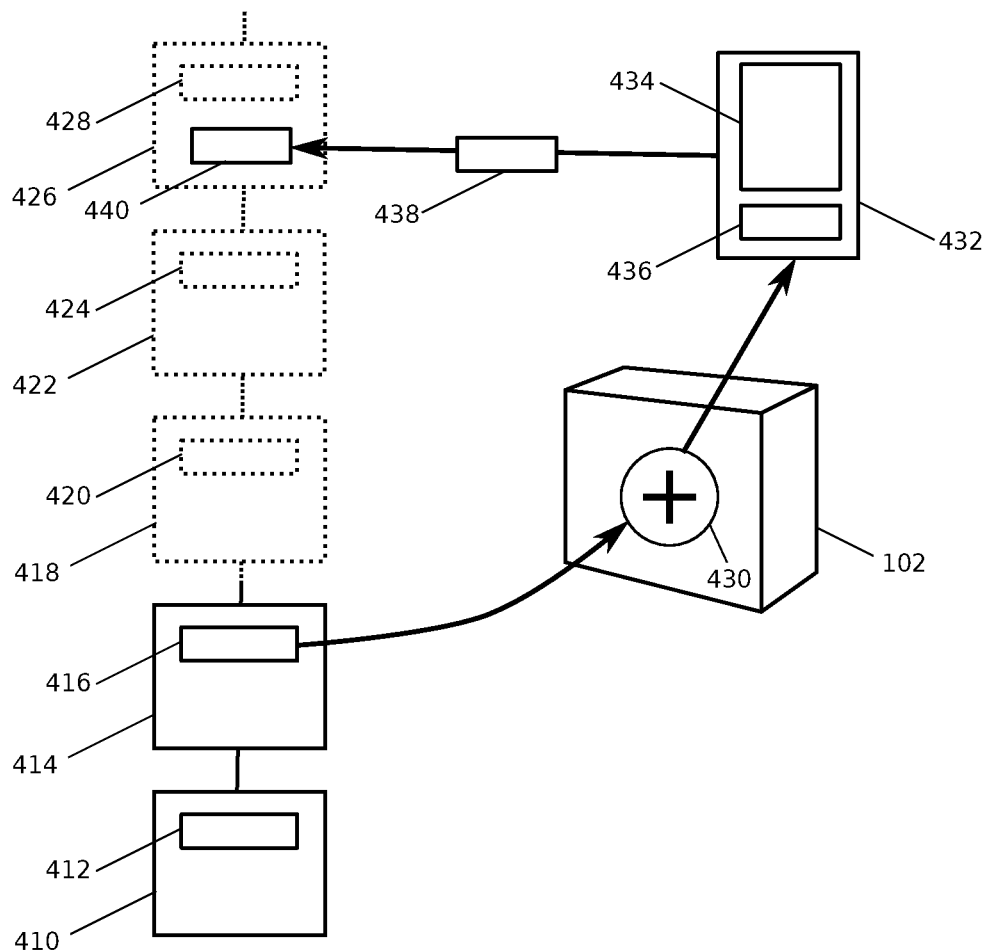
FIG. 4 is a diagram presenting a measurement of a current block height of the blockchain by the network connected device, said network connected device subsequently estimating a likely future block height, then including the indicator to the likely future block height in the digital item, calculating the hash of the digital item, and submitting a transaction comprising the hash to the blockchain for inclusion in a future block of the blockchain.

A diagram illustrating one possible embodiment of the system and steps taken for the generation and submission of the hash to the blockchain is presented in FIG. 4. Note that although the embodiment and example provided by FIG. 4 is for a generation and inclusion of a single hash of the digital item into the blockchain, the same apparatus and associated methods and processes apply to the generation and inclusion of multiple messages containing multiple hashes.

An embodiment of a method and system comprising a determination of a current location of a height of the blockchain, estimation of a likely future height of the blockchain at some point of time in a future, calculation of the hash of the digital item, and insertion or appending of said hash through a submission of the transaction comprising the hash to the blockchain is illustrated through FIG. 4. It should be noted that although in the example provided by FIG. 4 the method proceeds through a determination of the height of the blockchain, the method may equally utilize the size of the blockchain, timestamps encoded within the blockchain, markers present within a data structure of the blockchain, or other equivalent indications of the current and potential future state of the blockchain.

In the aforementioned embodiment, a prior block 410 comprises a prior block height 412. A current block 414 comprises a current block height 416. The prior block height and current block height may be represented by a binary string, a text string or other data structure contained respectively within the prior block and the current block.

The network connected device 102 may, in this embodiment, retrieve the current block height from the blockchain, for example by querying an other one of the plurality of network connected devices participating on the peer-to-peer network, or directly from a copy of the blockchain stored on the network connected device.

The network connected device 102 may then estimate a likely future block height, through an estimator function 430, and may insert the likely future block height into a new digital item 432, said new digital item comprising an original digital item 434, the likely future block height 436. A hash of the new digital item 438 may also be calculated.

In one embodiment, the estimator function 430 may consist of a simple sum of the current block height 416 and a constant. The constant may be theoretically or empirically determined. In a different embodiment the estimator function 430 may comprise determining a variable to sum with the current block height, said variable determined through an assessment of one, some or all of: a measured network latency, a measurement of available processing power available to the network connected device at a current time, an averaging of a rate of block addition to the blockchain over a recent period, or some other deterministic or empirical assessment of a likelihood of a submission of a transaction comprising the hash 438 of the new digital item 432 at a given height, time, or size of the blockchain at some point at a future time.

The transaction comprising the hash of the new digital item may comprise a binary block, a character-based string, or a data structure which may itself comprise a collection of keys, values, timestamps, and other substructures of data as well as the hash.

In the embodiment represented by FIG. 4, as the network connected device 102 performs various computations such as an execution of the estimator function 430, a further block 418 with a block height 420 may be added to the blockchain. A subsequent block 422 with a block height 424 may subsequently be added to the blockchain. In this example, the network connected device 102 may then submit a transaction comprising the hash 438 of the new digital item 432 to the plurality of network connected devices for inclusion in the blockchain. In this illustrative example the transaction comprising the hash 438 is then included in a next block 426 with a next block height 428 as a block data item 440 comprising the transaction. In this example, if the likely future block height 436 and the next block height 428 are the same, then the hash 438 has successfully been included in the blockchain at a correct location.

The blockchain may comprise a complex multi-part system, consisting of a plurality of network connected devices that may be acting as independent entities with latencies in a communication of a progress of an extension of the blockchain. As such, events described above in an examination of FIG. 4 may not always progress as reliably or smoothly as in the illustrative example. As a result, in FIG. 5 we examine a possible strategy for ensuring the hash of the digital item is eventually included in the blockchain at a location specified within the digital item, even under more difficult circumstances. Those skilled in the art will appreciate that the possible strategy presented is a specific example of an application of the possible strategy, and that events may play out in many ways. Similarly, the possible strategy is just one of many approaches that may be taken to ensure the hash of the new digital item is included at a correct location.

Returning then to FIG. 5, we again see the network connected device 102, and the estimator function 430, which together produce the likely future block height 436 for inclusion in the new digital item 432 comprising the original digital item 434. The hash of the new digital item 438 is then calculated.

Figure 5:
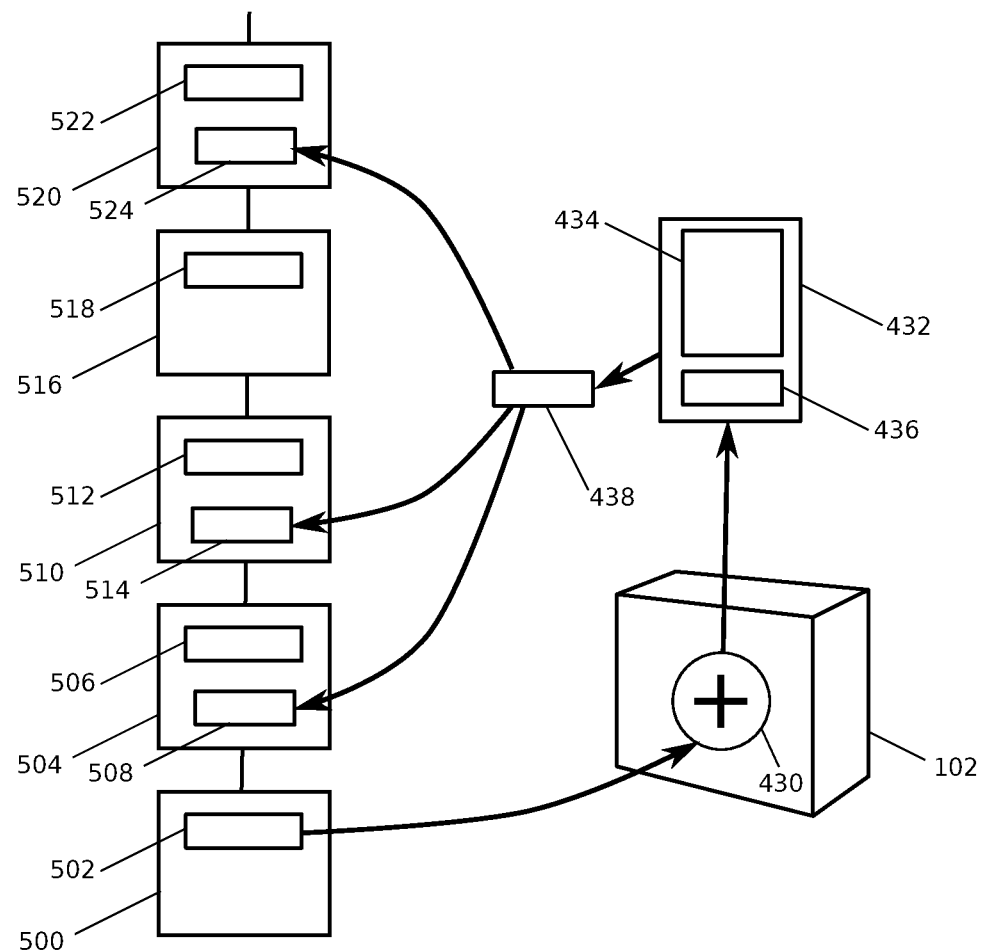
FIG. 5 is a diagram presenting the network connected device submitting the indicator to the blockchain multiple times, until the indicator is included on the blockchain at the location indicated by the indicator.

In the example presented by FIG. 5, five sequential block of the blockchain are illustrated (500, 504, 510, 516 and 520). A first block 500 contains a first block height 502. This block 500 may have been generated during an execution of the estimator function 430 and a generation of the new digital item 432 on the network connected device 102.

It is after the inclusion of this block 500 in the blockchain that, in this example, the network connected device submits a transaction 508 comprising the hash 438 of the new digital item 432.

A second block 504 with a second block height 506 is then added to the blockchain, and the second block 504 now contains the transaction 508.

The network connected device 102 then determines that the second block height 506 is lower than the likely future block height 436 and that a new transaction comprising the hash 438 must therefore be transmitted.

The network connected device 102 then transmits the new transaction 514, which is included in a third block 510 with a third block height 512. Once again, in this example, the third block height 512 is lower than the likely future block height 436 and a further transaction comprising the hash 438 must therefore be transmitted.

In the current example a fourth block 516 with a fourth block height 518 is added to the blockchain by the plurality of network connected devices. This fourth block 516 does not contain the further transaction.

Finally, in the current example, a fifth block 520 with a fifth block height 522 is generated and added to the blockchain. The fifth block 520 contains the further transaction 524 comprising the hash 438 of the new digital item 432. The network connected device 102 compares the fifth block height 522 with the likely future block height 436, and determines that they match. As a result, the operation has concluded successfully, and no more transaction attempts are necessary.

Figure 6:
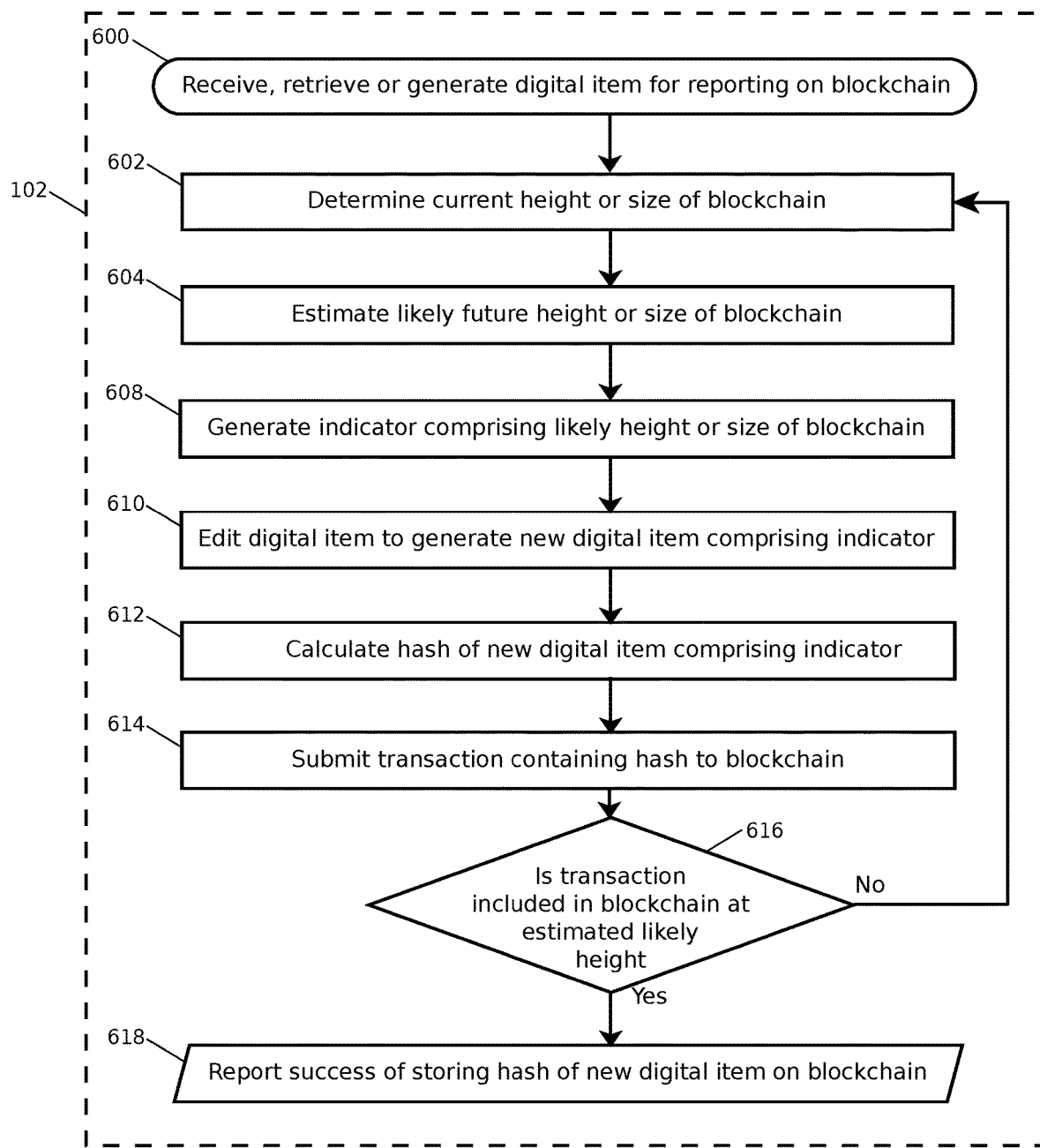
FIG. 6 is a flow diagram providing a general overview of a method and system for generating the indicator of the blockchain location for the hash of the digital item, including the indicator in the digital item, calculating the hash of the digital item, submitting the hash to the blockchain as part of the transaction, and verifying an inclusion of the indicator at a correct location within the blockchain, with the steps of the method repeated if the inclusion is determined as unsuccessful.

A high level flow diagram illustrating an embodiment of a method for iteratively generating the new digital item and associated likely future block height is presented in FIG. 6.

The steps comprising the embodiment illustrated by FIG. 6 are conducted in the network connected device 102. However, equivalently, the various steps comprising the method and system may be conducted over a distributed system, with respective determinations and actions taken on a variety of network connected devices, and results of determinations and actions passed between the variety of network connected devices over the network.

The method may start by the network connected device 102 receiving, retrieving from a network location, or by generating, a digital item for reporting on the blockchain, as shown in commencing step 600.

The network connected device 102 may then determine a current height or a current size of the blockchain, as shown in step 602. Alternately, it may determine a current time marked or recorded as a timestamp or other time record on the blockchain.

The network connected device 102 may then proceed by estimating a likely future height or likely future size of the blockchain at a point in time when a hash of the digital item may be transmitted to the blockchain for inclusion, as shown in step 604. In another embodiment, a prediction of a likely future time may be generated by the network connected device 102. The likely future height, likely future size or likely future time may be generated using an estimator function, or through some other means.

As shown in step 608, the network connected device 102 may then generate an indicator comprising the likely future height, likely future size or likely future time. The indicator may also comprise other information or data relevant to a verification of an integrity or a provenance of the digital item.

The network connected device 102 may then edit the digital item to comprise the indicator, as shown in step 610.

An edit may comprise an insertion, a prefixing or an appending of the indicator, or the indicator may even be separated into a plurality of parts, said plurality of parts distributed through the digital item. A new digital item is thus produced.

The network connected device 102 may then calculate a hash of the new digital item, as indicated in step 612. The hash may be calculated using a cryptographic hash function, which may comprise a one, or more, or a serial combination of: SHA, RIPEMD, Whirlpool, Scrypt, HAS-160, BLAKE, or other cryptographic hash function. The hash may be calculated using a part or all of the new digital item.

In step 614, the network connected device 102 may then submit a transaction to the blockchain, said transaction comprising the hash calculated in step 612. The transaction may also comprise other data, such as a timestamp, a resource locator for the new digital item, or other data.

In step 616, after a suitable period of time has passed, for example an expected duration for a creation of a next block on the blockchain, the network connected device 102 may determine whether or not the transaction has been included in the blockchain at the estimated likely location as calculated in step 604. In various embodiments this may be at: the future likely block height, the future likely blockchain size, a point marked with the timestamp matching the future likely time.

If the network connected device 102 determines in step 616 that the transaction is not included on the blockchain at the estimated likely location, the network connected device may return to step 602 and repeat the processes detailed in steps 602 through to step 616.

If the network connected device 102 determines in step 616 that the transaction is included on the blockchain at the estimated likely location, the network connected device may proceed to step 618.

In step 618, the network connected device 102 may report a success of storing the hash of the new digital item 432 on the blockchain. The success may trigger a subsequent publishing of the new digital item 432 on a server or website, an emailing of the new digital item 432 to an email address, or other notification or publication of the new digital item 432.

Figure 7:
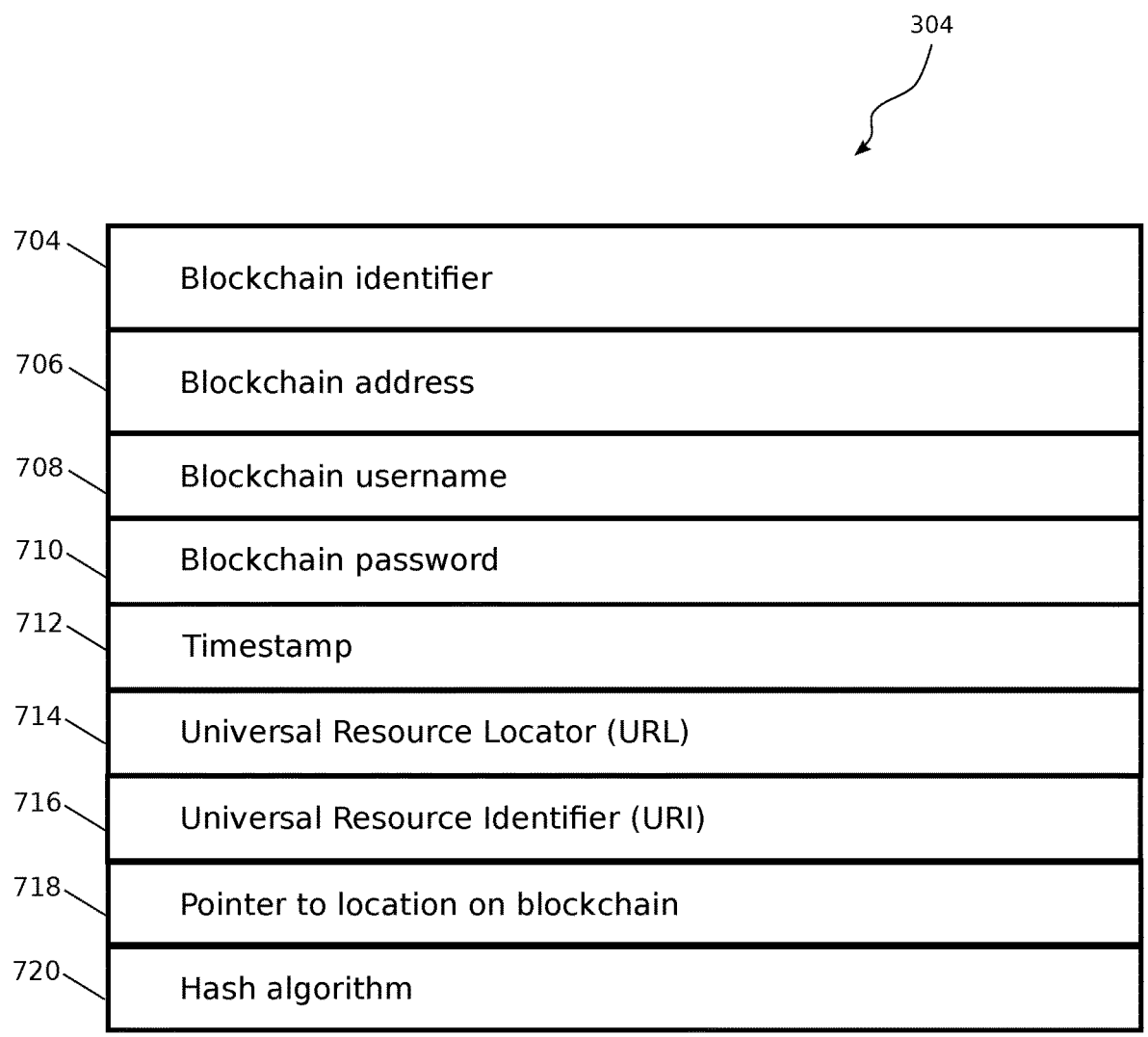
FIG. 7 is a block diagram illustrating a structure of a possible embodiment of the indicator for inclusion in the digital item, in accordance with an embodiment of the present disclosure.

We now proceed to a more detailed examination of embodiments of the indicator, illustrated in a block diagram shown in FIG. 7.

As shown in FIG. 7, an indicator 304 may comprise, but is not limited to: a blockchain identifier 704, a blockchain address 706, a blockchain username 708, a blockchain password 710, a timestamp 712, a universal resource locator (URL) 714, a universal resource identifier (URI) 716, a pointer to a location on the blockchain 718, a hash algorithm 720.

A blockchain identifier 704 may indicate that the hash is stored on a particular public blockchain, for example: a main Bitcoin blockchain, a Bitcoin testnet, an Ethereum blockchain, an Ethereum classic blockchain, or some other public blockchain.

In a different embodiment the blockchain identifier 704 may indicate that the hash is stored on a private blockchain, and may further indicate where the private blockchain may be located, discovered or connected to.

The blockchain address 706 may comprise an identity that is included in the transaction transmitted to the blockchain. For example, if the blockchain identifier 704 is for the public Bitcoin blockchain, the blockchain address 706 may comprise a Bitcoin address, such as 1F1tAaz5x1HUXrCNLbtMDgcw6o5GNn4xgX. Similarly, if the blockchain identifier 704 is for the public Ethereum blockchain, the blockchain address 706 may comprise an Ethereum address, such as 0x267be1C1D684F78cb4F6a176C4911b741E4Ffdc0.

If the blockchain identified by the blockchain identifier 704 is a private blockchain, such as, for example, a Hyperledger Fabric blockchain or a Multichain blockchain, in order to access the blockchain it may be necessary to supply the blockchain username 708 and the blockchain password 710. The indicator 304 may therefore comprise said blockchain username 708 and blockchain password 710 to allow access to the blockchain for retrieval of the hash of the digital item.

The timestamp 712 may indicate a time at which the indicator 304 was generated.

The URL 714 may indicate a network location, website, file transfer protocol server, or other resource location at which a resource may be found and retrieved, together with a protocol for retrieving the resource. For example, the digital item may be such a resource stored at a location referenced by the URL.

The URI 716 may indicate a named resource and possibly a location at which the named resource may be found and retrieved. For example, the digital item may be such a resource, and the URI 716 may comprise a filename, an international standard book number (ISBN), an International Standard Recording Code (ISRC), an International Standard Musical Work Code (ISWC), a Universal Product Code (UPC), or other identifier for the digital item.

The pointer to a location on the blockchain 718, may indicate where on the blockchain to look for the hash of the digital item. It may, for example, comprise a block height, a number of bytes in a blockchain file, a timestamp, or some other indicator, indicating where in the blockchain the hash or the transaction comprising the hash is recorded.

The hash algorithm 720 may indicate which hash algorithm was used to generate the hash of the digital item. Said hash algorithm may, for example, comprise a one, or more, or a serial combination of: SHA, RIPEMD, Whirlpool, Scrypt, HAS-160, BLAKE, or other cryptographic hash function.

In FIG. 8A a successful inclusion of a hash within a window of uncertainty on a blockchain is illustrated. A section of the blockchain is shown, comprising a first block 800 at a block height of 100 802, a second block 804 at a block height of 101 806, a third block 810 at a block height of 102 812, a fourth block 816 at a block height of 103 818, and fifth block 820 at a block height of 104 822.

The fourth block 816 also contains the hash 814 of the digital item, indicated by an indicator 890 obtained from the digital item, which indicates a likely location on the blockchain that in this example was estimated at a block height of 100, and a window of uncertainty of 4. As the indicator 890 specifies a height of 100, and 100+4=104 (the height plus the window of uncertainty), and furthermore the location of height 103 818 lies between 100 and 104, the hash is included within an acceptable neighborhood of the likely location quoted in the indicator 890, and thus the hash is successfully included on the blockchain and may be located if searched for within the range indicated by the likely location and the window of uncertainty.

In FIG. 8B an unsuccessful inclusion of an indicator outside of a window of uncertainty on a blockchain is illustrated. A section of the blockchain is shown, comprising a first block 850 at a block height of 200 852, a second block 854 at a block height of 201 856, a third block 860 at a block height of 202 862, a fourth block 866 at a block height of 203 868, and fifth block 870 at a block height of 204 872.

The fourth block 866 also contains the hash 864 of the digital item. However, the location indicated by an indicator 892 obtained from the digital item, indicates a likely location on the blockchain that in this example was estimated at a block height of 200, and a window of uncertainty of 2. As the hash 864 is included on the blockchain at a height of 203, and 200+2=202 (the likely location plus the window of uncertainty), the location of the hash 864 at 203 lies outside of a range 200 to 202, and so the hash 864 is not included within an acceptable neighborhood of the likely location quoted in the indicator 892, and thus the hash 864 is unsuccessfully included on the blockchain and may not be located if searched for within the range indicated by the likely location and the window of uncertainty. In this example, a last block indicated by the indicator 892 as an acceptable location is the third block 860.

In the preceding paragraphs of the disclosure, a description of a system and method for generating the digital item comprising the indicator, which indicates the location on the blockchain of the hash of the digital item, was provided. We now progress to a complementary method and system for extracting the indicator from the digital item and using it to locate and retrieve the hash from the blockchain in order to verify the integrity and provenance of the digital item.

Figure 9:
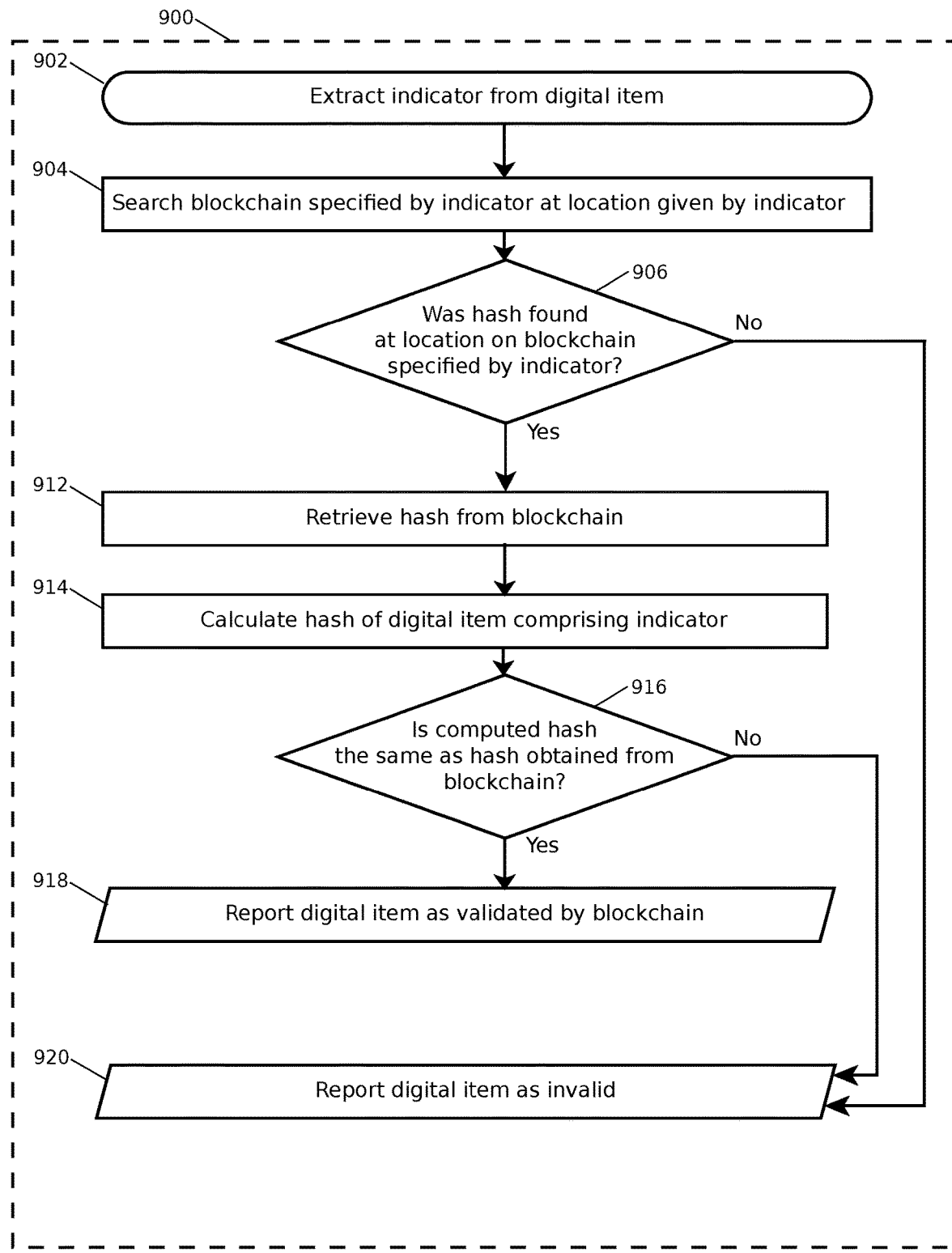
FIG. 9 is a flow diagram providing a general overview of a method and system for extracting an indicator from a digital item, searching a blockchain at a location specified by the indicator, retrieving a hash from the blockchain at the location searched, calculating the hash of the digital item, and comparing the hash retrieved and the hash calculated, in order to determine a veracity of the digital item.

FIG. 9 is a flow chart presenting an embodiment of the complementary method and system. An other network connected device 900 that has obtained a copy of the digital item may now determine the integrity and provenance of the digital item as follows.

In step 902 the other network connected device 900 may extract the indicator from the digital item. The indicator may be located through the presence of an indicator header or other digital data that shows where the indicator starts and how long it is. In another embodiment, the indicator may comprise a fixed length and be situated at the start or the end of the digital item.

The other network connected device 900 may then search the blockchain at the location given by the indicator for the presence of the hash or a transaction comprising the hash, in accordance with step 904.

If the other network connected device 900 determines in step 906 that the hash or the transaction comprising the hash is not included on the blockchain at the location given by the indicator, the other network connected device 900 may proceed to step 920 and report the digital item as invalid.

If the other network connected device 900 determines in step 906 that the hash or the transaction comprising the hash is included on the blockchain at the location given by the indicator, the other network connected device 900 may proceed to step 912.

In step 912 the other network connected device 900 may retrieve the hash from the blockchain.

In step 914 the other network connected device 900 may then generate a computed hash of the digital item. Those skilled in the art will appreciate that step 914 may be performed at this point or at any earlier point in the complimentary method under description. An algorithm for calculating the computed hash may be present in the indicator.

In step 916 the other network connected device 900 may then compare the computed hash with the hash retrieved from the blockchain.

If the computed hash and the hash retrieved from the blockchain are identical, the other network connected device 900 may then proceed to step 918, and may report the digital item as validated.

If the computed hash and the hash retrieved from the blockchain are not identical, the other network connected device 900 may then proceed to step 920, and may report the digital item as invalid.

The technology described herein is operatgable with numerous other general purpose or special purpose computing system environments or configurations. Examples of well-known computing systems, environments, and/or configurations that may be suitable for use with the disclosure include, but are not limited to, smartphones, tablets, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A processor may be any conventional general purpose single- or multi-chip processor such as an Arm® processor, a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor (GPU). The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic-link library.

The system may be used in connection with various operating systems such as Linux®, UNIX® or Microsoft Windows®.

The system may be written in any conventional programming language such as C, C++, Pascal, or Java, and run under a conventional operating system. C, C++, Pascal, Java, and FORTRAN are industry standard programming languages for which many commercial compilers can be used to create executable code. The system may also be written using interpreted languages such as Perl, Python or Ruby, or languages that may either be compiled or interpreted, such as BASIC or Lisp.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over, as one or more instructions or code, a computer-readable medium. Computer-readable media include both computer storage media and communication media including any medium that facilitates transfer of a computer program from one place to another. A storage medium may be any available media that can be accessed by a computer. By way of example, and not limitation, such computer-readable media may comprise RAM, ROM, EEPROM, Flash memory, CD-ROM or other optical disk storage, magnetic disk storage or other magnetic storage devices, or any other medium that may be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

As will be appreciated from the above discussion, an advantage of the systems and methods of this disclosure includes generating a hash, subsequently recorded on a blockchain, of a digital item that comprises an indicator, such that the indicator shows where on the blockchain the hash of the digital item is stored. This results in a bi-directional recording of the provenance of the digital item: the hash on the blockchain provides a tamper proof record of the veracity of the digital item, and the location of the hash may be deduced from the digital item itself, thus reducing the network bandwidth, computation power and memory required by a computational device searching for the hash.

What is claimed is:

1. A method for generating an indicator to a location on a blockchain of a hash of a digital item, such that the digital item comprises the indicator, and the hash is stored on the blockchain at the location indicated by the indicator, comprising steps:
   (A) determining a current location on the blockchain;
   (B) estimating a future location on the blockchain;
   (C) generating the indicator comprising the future location on the blockchain;
   (D) editing a first digital item to generate the digital item, said digital item comprising: the first digital item and the indicator;
   (E) calculating the hash of the digital item;
   (F) submitting a transaction comprising the hash of the digital item for recording on the blockchain at the future location; and
   (G) repeating steps (A)-(F) until the transaction is verified as successfully recorded on the blockchain at the future location, wherein the future location is different for each repetition.

2. The method of claim 1, wherein the current location comprises one or more of: a current block height, a current blockchain size, a block with a predetermined identifier, a current timestamp; and, correspondingly, the future location comprises one or more of: a future block height, a future blockchain size, a subsequent block with a subsequently determined identifier, a future timestamp.

3. The method of claim 1, wherein the indicator further comprises one or more of: a resource identifier, a hash algorithm.

4. The method of claim 1, wherein the indicator further comprises a digital signature signed using a private key associated with a public key, and the transaction is signed using the private key.

5. The method of claim 1, wherein the future location comprises a location window of uncertainty.

6. The method of claim 5, wherein the location window of uncertainty comprises one or more of: a predetermined number of blocks, a predetermined data size, a predetermined period of time.

7. The method of claim 6, comprising verifying an inclusion of the recording of the transaction on the blockchain as successful if the transaction lies on the blockchain at an actual location within a distance, from the future location, specified by the location window of uncertainty.

8. The method of claim 1 for retrieving the hash of the digital item from the location on the blockchain for comparison with a computed hash of the digital item, by:
   extracting the indicator from the digital item;
   retrieving the hash from the blockchain at the location provided by the indicator for the hash;
   producing the computed hash of the digital item; and
   returning a successful result if the comparison of the computed hash and the hash retrieved from the blockchain are identical.

9. The method of claim 8, wherein the indicator comprises a location window of uncertainty.

10. The method of claim 9, further comprising searching for the hash of the digital item on the blockchain in an area around the location specified by the location window of uncertainty.

11. The method of claim 9, wherein the location window of uncertainty comprises one or more of: a predetermined number of blocks, a predetermined data size, a predetermined period of time.

12. The method of claim 8, wherein the indicator comprises a hash algorithm, and the computed hash of the digital item is calculated using said hash algorithm.

13. A plurality of network connected devices, each comprising: one or more hardware processors, and storage media comprising computer instructions, said plurality of network connected devices being connectible via a network to each other, arranged such that when computer instructions are executed on the one or more hardware processors of one or more of the plurality of network connected devices, operations are caused on a first of the plurality of network connected devices for generating an indicator to a location on a blockchain, said blockchain being maintained and extended by a remainder of the plurality of network connected devices, of a hash of a digital item, such that the digital item comprises the indicator, and the hash is stored on the blockchain at the location, by the remainder of the plurality of network connected devices, comprising the steps:
   (A) determining, by the first of the plurality of network connected devices, a current location on the blockchain;
   (B) estimating, by the first of the plurality of network connected devices, a future location on the blockchain;
   (C) generating, by the first of the plurality of network connected devices, the indicator comprising the future location on the blockchain;
   (D) editing, by the first of the plurality of network connected devices, a first digital item to generate the digital item, said digital item comprising: the first digital item and the indicator;
   (E) calculating, by the first of the plurality of network connected devices, the hash of the digital item;
   (F) submitting, by the first of the plurality of network connected devices, to one or more of the remainder of the plurality of network connected devices, a transaction comprising the hash of the digital item for a recording on the blockchain at the future location by the one or more of the remainder of the plurality of network connected devices; and
   G) repeating, by the first of the plurality of network connected devices, steps (A)-(F) until the first of the plurality of network connected devices verifies the transaction as successfully recorded on the blockchain at the future location, wherein the future location is different for each repetition.

14. The plurality of network connected devices of claim 13, wherein the current location determined by the first of the plurality of network connected devices comprises one or more of: a current block height, a current blockchain size, a block with a predetermined identifier, a current timestamp; and, correspondingly, the future location estimated by the first of the plurality of network connected devices comprises one or more of: a future block height, a future blockchain size, a subsequent block with a subsequently determined identifier, a future timestamp.

15. The plurality of network connected devices of claim 13, wherein the indicator generated by the first of the plurality of network connected devices further comprises one or more of: a resource identifier, a hash algorithm.

16. The plurality of network connected devices of claim 13, wherein the indicator generated by the first of the plurality of network connected devices further comprises a digital signature signed by the first of the plurality of network connected devices using a private key associated with a public key, and the transaction submitted by the first of the plurality of network connected devices is signed by the first of the plurality of network connected devices using the private key.

17. The plurality of network connected devices of claim 13, wherein the future location, estimated by the first of the plurality of network connected devices, comprises a location window of uncertainty.

18. The plurality of network connected devices of claim 17, wherein the location window of uncertainty, estimated by the first of the plurality of network connected devices, comprises a one or more of: a predetermined number of blocks, a predetermined data size, a predetermined period of time.

19. The plurality of network connected devices of claim 18, wherein the first of the plurality of network connected devices classifies an inclusion of the recording of the transaction on the blockchain as successful if the transaction is recorded on the blockchain by the remainder of the plurality of network connected devices at an actual location within a distance, from the future location, specified by the location window of uncertainty.

20. The plurality of network connected devices of claim 13, wherein a second of the plurality of network connected devices is arranged such that when computer instructions are executed on the one or more processors of the second of the plurality of network connected devices, operations are caused for retrieving the hash of the digital item from the location on the blockchain, comprising:
  extracting, by the second of the plurality of network connected devices, the indicator from the digital item;
  retrieving, by the second of the plurality of network connected devices, the hash from the blockchain at the location provided by the indicator for the hash;
  producing, by the second of the plurality of network connected devices, the computed hash of the digital item;
  performing, by the second of the plurality of network connected devices, a comparison of the computed hash and the hash retrieved from the blockchain; and
  returning, by the second of the plurality of network connected devices, a successful result if the computed hash and the hash retrieved from the blockchain are identical.

21. The plurality of network connected devices of claim 20, wherein the indicator, retrieved by the second of the plurality of network connected devices, comprises a location window of uncertainty.

22. The plurality of network connected devices of claim 21, further comprising searching, by the second of the plurality of network connected devices, for the hash of the digital item on the blockchain in an area around the location specified by the location window of uncertainty.

23. The plurality of network connected devices of claim 21, wherein the location window of uncertainty, retrieved by the second of the plurality of network connected devices, comprises one or more of: a predetermined number of blocks, a predetermined data size, a predetermined period of time.

24. The plurality of network connected devices of claim 20, wherein the indicator retrieved by the second of the plurality of network connected devices, comprises a hash algorithm, and the computed hash of the digital item is calculated using said hash algorithm.

* * * * *